United States Patent [19]

Cooper

[11] Patent Number: 4,871,219
[45] Date of Patent: Oct. 3, 1989

[54] WIDE SPECTRAL BAND INFRARED REFRACTIVE LENS

[75] Inventor: Erwin E. Cooper, Carrollton, Tex.

[73] Assignee: Texas Instruments Incorporated, Dallas, Tex.

[21] Appl. No.: 218,420

[22] Filed: Jul. 12, 1988

Related U.S. Application Data

[63] Continuation of Ser. No. 122,953, Nov. 19, 1987, abandoned.

[51] Int. Cl.$^4$ ............ G02B 3/00; G02B 9/12; G02B 23/00
[52] U.S. Cl. .................. 350/1.4; 350/453; 350/474; 350/572
[58] Field of Search ............ 350/1.3, 1.4, 453, 472, 350/474, 572

[56] References Cited

U.S. PATENT DOCUMENTS 3,778,133 12/1973 Tatian ...................... 350/1.4
4,679,891 7/1987 Roberts ...................... 350/474 X
4,714,307 12/1987 Palmer ...................... 350/1.4 X

OTHER PUBLICATIONS

Jamieson, "Ultra-Wide Waveband Optics", Proceedings of Spie, vol. 430, 1983.

Primary Examiner—Bruce Y. Arnold
Assistant Examiner—David J. Edmondson
Attorney, Agent, or Firm—Rene E. Grossman; Ferdinand M. Romano; Melvin Sharp

[57] ABSTRACT

The disclosure relates to a wide spectral band objective refractive apochromatic lens system capable of operation with infrared light in the 3 to 12 micron range with good color correction simultaneously. The lens system includes three lenses, the first lens being positive and formed of Texas Instruments 1173 glass and the second and third lenses being negative and formed of germanium and zinc sulfide respectively. The germanium lens has a power approximately 0.44 that of the 1173 glass lens and the zinc sulfide lens has a power approximately 0.22 that of the 1173 glass lens.

31 Claims, 3 Drawing Sheets

WIDE SPECTRAL BAND INFRARED REFRACTIVE LENS

This application is a continuation of application Ser. No. 122,953 filed Nov. 19, 1987, now abandoned.

BACKGROUND OF THE INVENTION

1. FIELD OF THE INVENTION

This invention relates to a refractive lens system and, more specifically, to a wide spectral band refractive lens capable of operation in the 3 to 13 micron infrared ranges, providing for simultaneous use of both the 3 to 5 and 8 to 12 micron atmospheric windows.

2. BRIEF DESCRIPTION OF THE PRIOR ART

Prior art refractive lens systems which operate in the infrared frequency range are generally restricted to operation in either the 3 to 5 micron range or the 8 to 12 micron range, but not both. This is due to the fact that prior art lens designs are not adequate to operate in both ranges. The reason for this problem is that the refractive indices of the lens materials vary from one band to the other for different frequencies, thereby providing a color problem as the operating frequency changes. In view of this problem, the prior art systems which have been capable of operation in both infrared bands have utilized reflective or mirror-type system whereby the color problem is removed. Reflective optics have some disadvantages. For example, large fields of view cannot be obtained. Also, central obscurations limit the diffraction modulation transfer function (MTF) in the 8 to 12 micron band. Furthermore, there are difficulties in integrating reflective optics with large fields of regard, azimuth and elevation, search mirrors and derotation prisms. It is therefore apparent that a system has been long sought which provides the advantages of refractive optics, yet is capable of operation in both the 3 to 5 and 8 to 12 micron ranges simultaneously, as is the case with reflective optics.

SUMMARY OF THE INVENTION

In accordance with the present invention, there is provided a wide spectral band infrared refractive lens system which operates in the 3 to 13 micron range.

The above is accomplished by providing a multiple lens arrangement wherein three different lens materials are used in conjunction with three different lenses whereby changes or differences in the refractive indices of the individual lenses at different frequencies is compensated for by simultaneous changes or differences in the refractive index of the other ones of the lenses at the different frequencies. In this way, as the infrared frequency changes or when a broad spectrum of infrared frequencies is simultaneously being received, the lens system stays essentially focused to a common image plane at all of the frequencies in the range of 3 to 13 microns.

Since different detecting elements are usually employed in the 3 to 5 micron and 8 to 12 micron ranges, thereby requiring separate focusing, this invention can also be employed where a common focal plane for both bands is not mandatory.

Briefly, in accordance with the present invention, there is provided an apochromatic infrared lens design which has good color correction from 3 microns to 13 microns, thus allowing a single refractive lens system to operate at both 3 to 5 microns and 8 to 12 microns simultaneously. The lens system comprises a first lens formed of Texas Instruments 1173 glass, a second lens formed of germanium and a third lens formed of zinc sulfide, preferably in that order. The Texas Instruments 1173 glass is a chalcogenide glass having a refractive index of 2.6047 and dispersion of 167 and can be replaced by other chalcogenide glasses with refractive index and dispersion properties similar thereto. The Texas Instruments 1173 lens is a positive lens element, the germanium lens is a negative lens element and the zinc sulfide lens is a negative lens element. In addition, the power of the negative germanium lens is from about 0.40 to about 0.48 and preferably 0.44 of that of the positive Texas Instruments 1173 lens and the power of the negative zinc sulfide lens is from about 0.18 to about 0.26 and preferably 0.22 times that of the positive Texas Instruments 1173 lens. It should be understood that the order of the lenses as described can be reversed. The lens polarities cannot be changed.

DESCRIPTION OF THE PREFERRED EMBODIMENT

Figure 1:
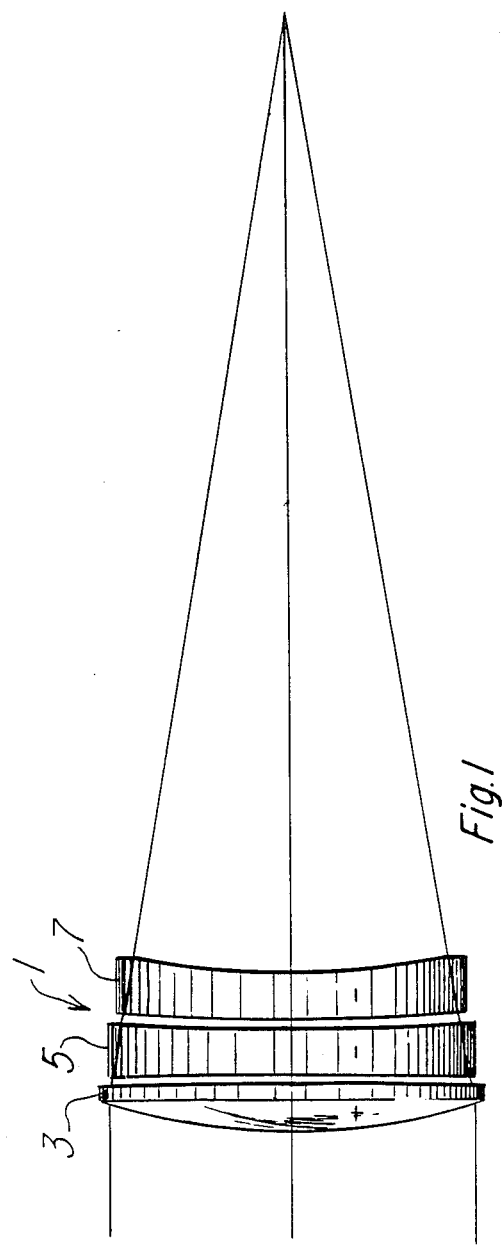
FIG. 1 is a side view of an on axis wide spectral band objective lens system in accordance with the present invention.

Referring now to FIG. 1, there is shown a wide spectral band objective lens system 1 in accordance with the present invention. The lens system includes a positive lens 3 formed of Texas Instruments 1173 glass, a negative lens 5 formed of germanium and a negative lens 7 formed of zinc sulfide. The negative germanium lens 5 has a power which is about 0.44 times that of the positive chalcogenide lens 3 and the negative zinc sulfide lens 7 has a power which is about 0.22 times that of the positive lens 3. The curvatures will vary somewhat with the application. Note the curvatures in FIG. 1 versus FIG. 3.

Figure 2:
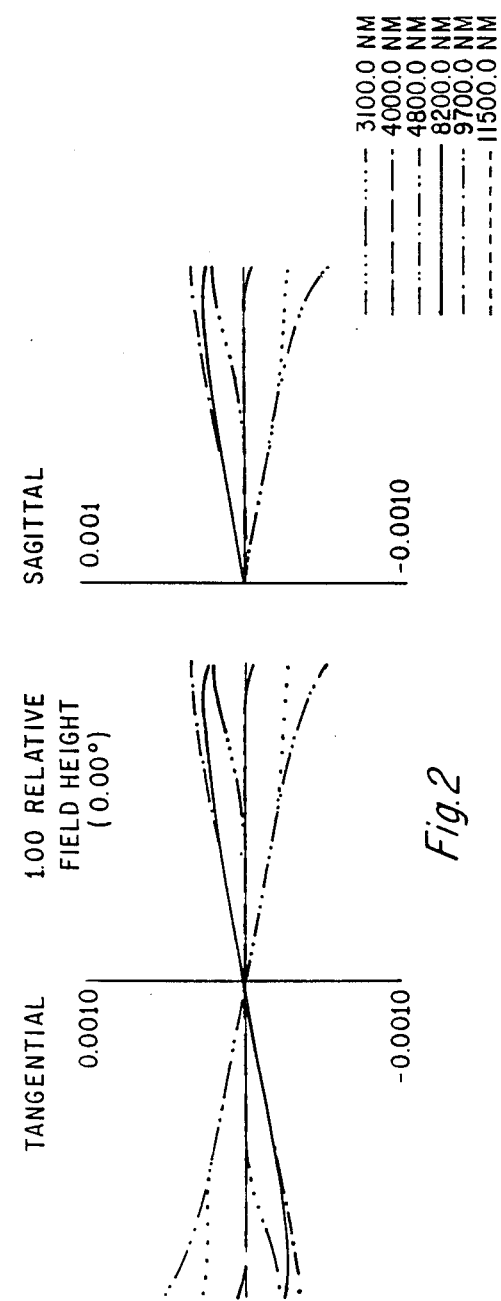
FIG. 2 is a graph of the ray fans for wavelengths in the 3 to 12 micrometer spectrum in inches of the lens system of FIG. 1.

As is depicted in FIG. 1, incoming parallel rays of any frequency in the 3 to 13 micrometer range are focussed on the same point by the lens system 1. FIG. 2 is a graph showing ray aberration for the lens system of FIG. 1 wherein the graph is scaled in inches and the lines there represent the following wavelengths: a dash followed by four dots represents 3100.0 nm, all dashes represent 4000.0 nm, a dash and two dots represents 4800.0 nm, a solid line represents 8200.0 nm, a dash followed by a dot represents 8700.0 nm and all dots represents 11500 nm. It can be seen that the amount of aberration is small and that the lens system 1 performs in accordance the the desired properties.

Figure 3:
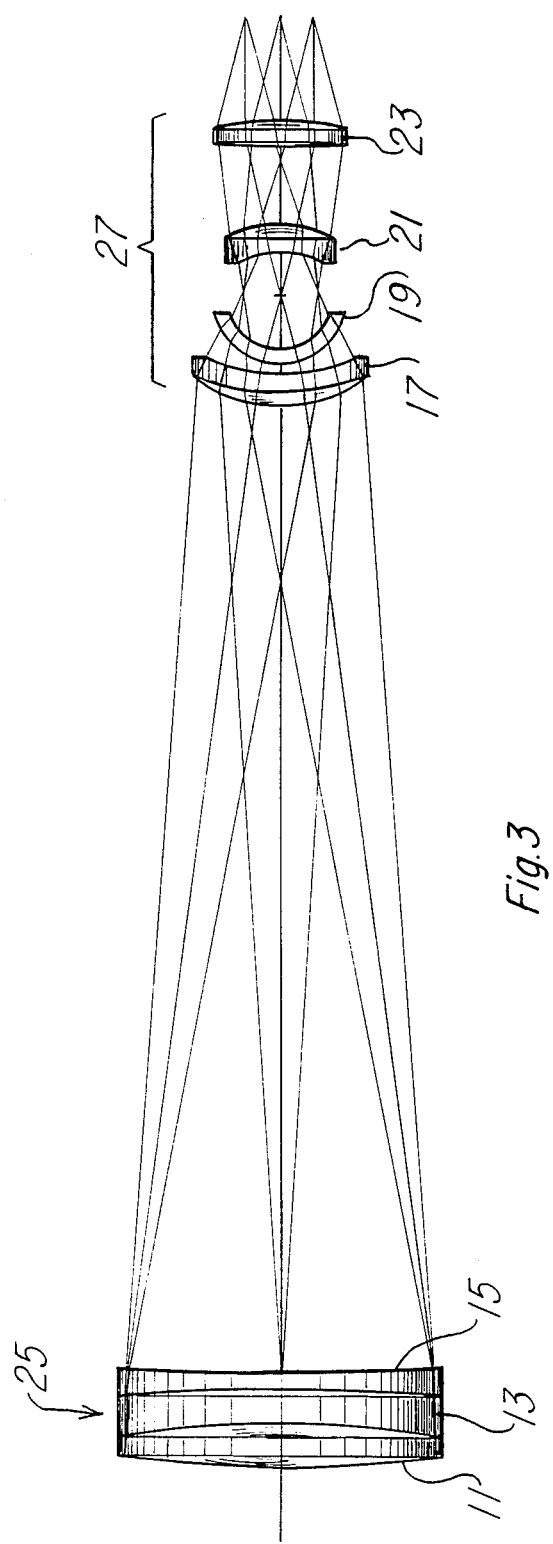
FIG. 3 is an infrared reimaging afocal lens system which utilizes the infrared apochromat as the objective lens of the afocal system.

Referring now to FIG. 3, there is shown a wide spectral band afocal lens system in accordance with the present invention. The lens system includes the wide spectral band objective lens system 25 which is similar in design to that of lens system 1 of FIG. 1 and has a long focal length and includes a positive chalcogenide lens 11, a negative germanium lens 13 and a negative zinc sulfide lens 15. The lens system also includes a short focal length lens system 27. The short focal length lens system includes a positive lens 17 formed from Texas Instruments 1173 glass followed by a negative lens 19 formed of zinc sulfide. This lens is followed by a further positive lens 21 of Texas Instruments 1173 glass with a final positive lens 23 of Texas Instruments 1173 glass. The lens system of FIG. 3 is capable of receiving collimated light and transmitting collimated light therefrom of different magnification. The afocal lens of FIG. 3 has a 4 inch aperture and a 7 degree field of view with a magnification of 4.5X.

Figure 4:
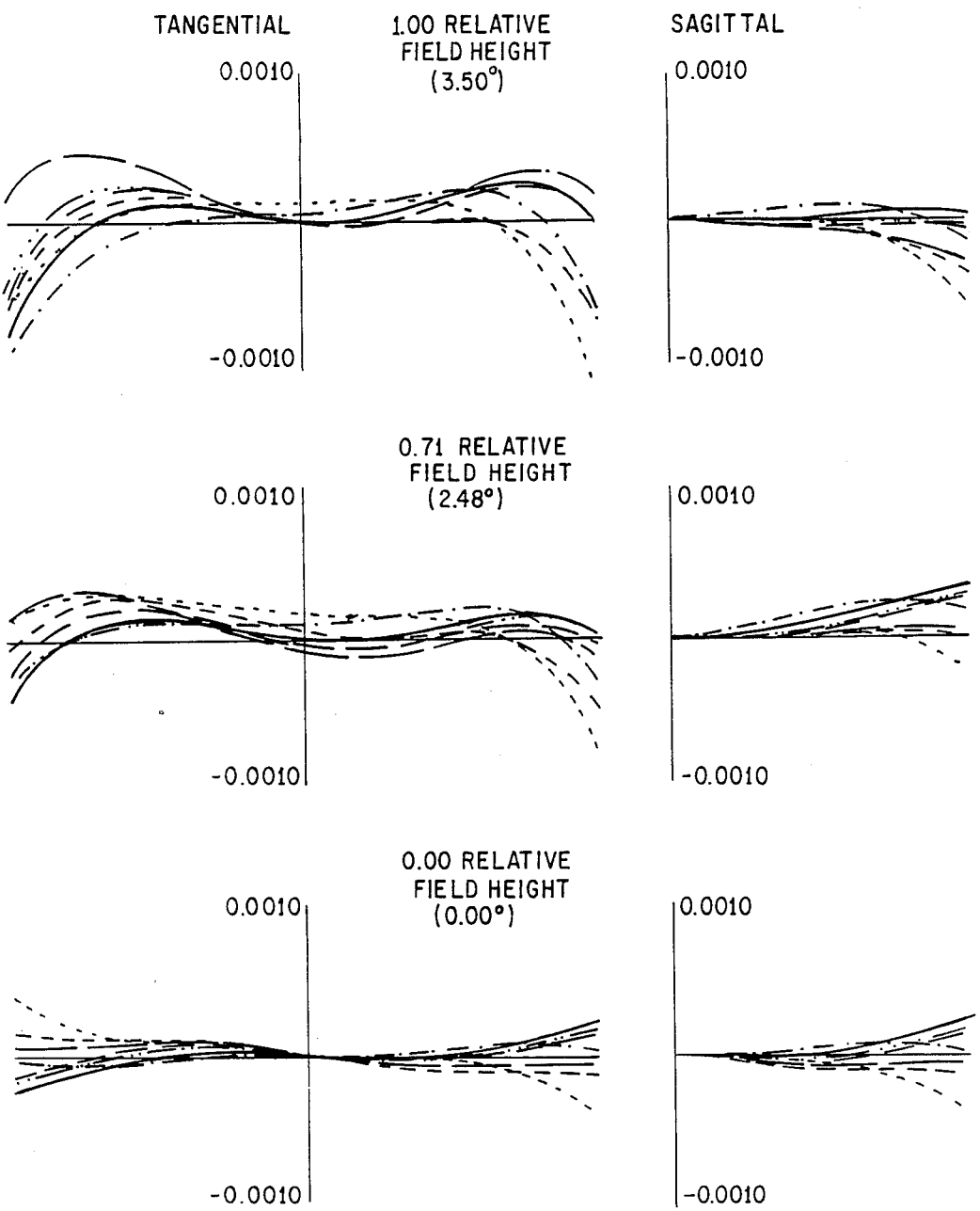
FIG. 4 is a graph of the resulting ray fans for several wavelengths from 3 to 13 micrometers for various field angles.

FIG. 4 is a graph showing ray aberration for the lens system of FIG. 3 wherein the graph is scaled in inches and the lines there represent the following wavelengths: all long dashes represents 3000.0 nm, a dash followed by four dots represents 4200.0 nm, all short dashes represents 5400.0 nm, a solid line represents 7000.0 nm, all very short dashes represents 8800.0 nm, a dash followed by a dot represents 11400 nm and all dots represents 13000 nm. It can be seen that amount of aberration is small and that the lens system of FIG. 3 performs in accordance the the desired properties.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A wide spectral band infrared refractive lens system comprising:
   a first lens comprising a chalcogenide glass;
   a second lens comprising germanium; and
   a third lens comprising zinc sulfide;
   said first lens having a predetermined refractive index and dispersion to maintain said lens system simultaneously essentially focused to a common image plane at all of the frequencies in the range of 3 to 13 microns.

2. The lens system of claim 1 wherein said first lens is a positive lens and said second and third lenses are negative lenses.

3. The lens system of claim 2 wherein the power of said second lens is from about 0.40 to about 0.48 that of said first lens and the power of said third lens is from about 0.18 to about 0.26 that of said first lens.

4. The lens system of claim 1 wherein the power of said second lens is from about 0.40 to about 0.48 that of said first lens and the power of said third lens is from about 0.18 to about 0.26 that of said first lens.

5. The lens system of claim 1 wherein the first lens has a refractive index of 2.6047.

6. The lens system of claim 1 wherein the second lens is positioned between the first and third lenses and the first lens is positioned to receive radiation before the second lens.

7. A wide spectral band infrared afocal lens system comprising:
   a first lens comprising a chalcogenide glass;
   a second lens comprising germanium; and
   a third lens comprising zinc sulfide; and
   a collimating lens system for collimating the output of said third lens;
   said first lens having a predetermined refractive index and dispersion to maintain said lens system simultaneously essentially focused to a common image plane at all of the frequencies in the range of 3 to 13 microns.

8. The lens system of claim 7 wherein said first lens is a positive lens and said second and third lenses are negative lenses.

9. The lens system of claim 8 wherein the power of said second lens is from about 0.40 to about 0.48 that of said first lens and the power of said third lens is from about 0.18 to about 0.26 that of said first lens.

10. The lens system of claim 8, wherein said collimating lens system includes a fourth positive lens, a fifth negative lens, a sixth positive lens and a seventh positive lens.

11. The lens system of claim 10 wherein said fourth, sixth and seventh lenses are formed from said chalcogenide glass and said fifth lens is formed from zinc sulfide.

12. The lens system of claim 7, wherein the power of said second lens is from about 0.40 to about 0.48 that of said first lens and the power of said third lens is from about 0.18 to about 0.26 that of said first lens.

13. The lens system of claim 7 wherein said collimating lens system includes a fourth positive lens, a fifth negative lens, a sixth positive lens and a seventh positive lens.

14. The lens system of claim 13, wherein said fourth, sixth and seventh lenses are formed from said chalcogenide glass and said fifth lens is formed from zinc sulfide.

15. A wide spectral band infrared refractive lens system consisting essentially of, in combination,
   (a) a first lens formed from chalcogenide glass having a refractive index of about 2.6047 and a dispersion of about 167,
   (b) a second lens formed from germanium, and
   (c) a third lens formed from zinc sulfide.

16. The lens system of claim 15 wherein the spectral range is from 3 to 13 microns with a common focus plane.

17. The lens system of claim 16 wherein said first lens is a positive lens and said second and third lenses are negative lenses.

18. The lens system of claim 17 wherein the power of said second lens is from about 0.40 to about 0.48 that of said first lens and the power of said third lens is from about 0.18 to about 0.26 that of said first lens.

19. The lens system of claim 16 wherein the power of said second lens is from about 0.40 to about 0.48 that of said first lens and the power of said third lens is from about 0.18 to about 0.26 that of said first lens.

20. An afocal lens system comprising combination:
   (a) a wide spectral band infrared refractive lens system consisting essentially of, in combination,
   (b) a first lens formed from chalcogenide glass having a refractive index of about 2.6047 and a dispersion of about 167,
   (c) a second lens formed from germanium,
   (d) a third lens formed from zinc sulfide, and
   (e) a collimating lens system for collimating the output of said third lens.

21. The lens system of claim 20 wherein said first lens is a positive lens and said second and third lenses are negative lenses.

22. The lens system of claim 21 wherein the power of said second lens is from about 0.40 to about 0.48 that of said first lens and the power of said third lens is from about 0.18 to about 0.26 that of said first lens.

23. The lens system of claim 22 wherein said collimating lens system includes a fourth positive lens, a fifth negative lens, a sixth positive lens and a seventh positive lens.

24. The lens system of claim 23 wherein said fourth, sixth and seventh lenses are formed from said chalcogenide glass and said fifth lens is formed from zinc sulfide.

25. The lens system of claim 21 wherein said collimating lens system includes a fourth positive lens, a fifth negative lens, a sixth positive lens and a seventh positive lens.

26. The lens system of claim 25 wherein said fourth, sixth and seventh lenses are formed from said chalcogenide glass and said fifth lens is formed from zinc sulfide.

27. The lens system of claim 20 wherein the power of said second lens if from about 0.40 to about 0.48 that of said first lens and the power of said third lens is from about 0.18 to about 0.26 that of said first lens.

28. The lens system of claim 27 wherein said collimating lens system includes a fourth positive lens, a fifth negative lens, a sixth positive lens and a seventh positive lens.

29. The lens system of claim 28 wherein said fourth, sixth and seventh lenses are formed from said chalcogenide glass and said fifth lens is formed from zinc sulfide.

30. The lens system of claim 20 wherein said collimating lens system includes a fourth positive lens, a fifth negative lens, a sixth positive lens and a seventh positive lens.

31. The lens system of claim 30 wherein said fourth, sixth and seventh lenses are formed from said chalcogenide glass and said fifth lens is formed from zinc sulfide.

* * * * *